March 25, 1924.
G. H. SARGENT
WATER GAUGE
Filed June 15, 1922
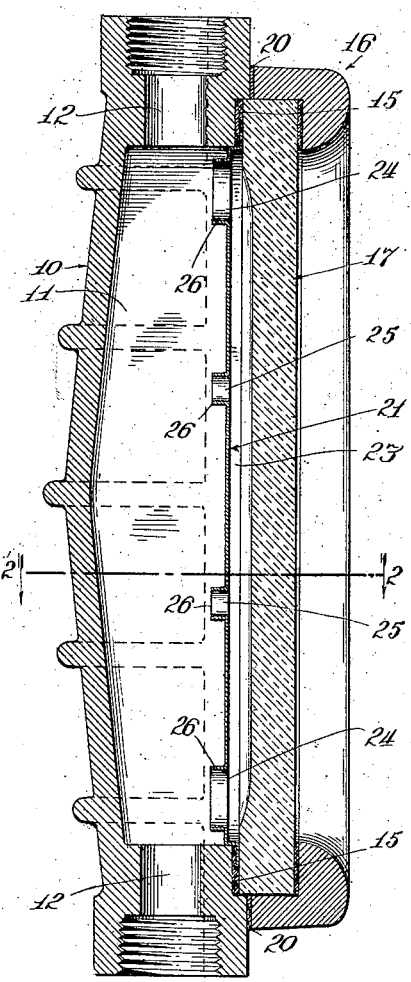
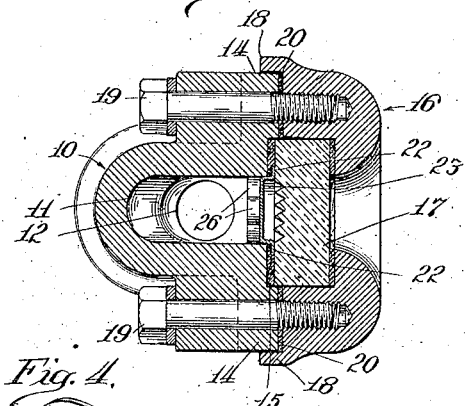
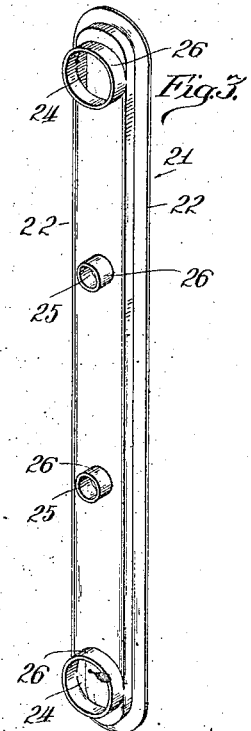

Patented Mar. 25, 1924.

1,488,065

UNITED STATES PATENT OFFICE.

GEORGE H. SARGENT, OF CHICAGO, ILLINOIS.

WATER GAUGE.

Application filed June 15, 1922. Serial No. 568,506.

*To all whom it may concern:*

Be it known that I, GEORGE H. SARGENT, a citizen of the United States, and a resident of Chicago, in the county of Cook and State of Illinois, have invented certain new and useful Improvements in Water Gauges, of which the following is a description, reference being had to the accompanying drawing.

My invention relates to water gauges employed with steam boilers and the like for the purpose of indicating fluid level, under pressure; and generally stated the invention comprises a metallic casing formed to provide a water chamber disposed lengthwise of the casing with connections at the upper and lower ends thereof in the manner usual in gauges of this type. The invention also contemplates a gauge wherein one wall or forward side thereof consists of a sight-glass removably secured in place and in a manner to effect fluid-tight connection and at the same time enable a disassociation of the respective parts of the gauge for repair and the like when occasion requires.

The invention more specifically stated comprises means whereby the interior of the gauge may be divided to provide a circulating space for the water at a point removed from the inner or rear face of the sight-glass, while at the same time permitting the water to enter the space immediately adjacent the inner side of the sight-glass and present a water level similar to and identical with the water level in the main portion or water chamber of the gauge; the latter mentioned portion being in direct alignment with the connections provided intermediate of the top and bottom ends of the gauge and the boiler.

The object of my invention is to provide means of the type hereinbefore referred to whereby a separate space or chamber is provided immediately adjacent the rear or inner side of the sight-glass, with said means, however, of such nature as not to prevent or interfere with a proper reading of the water level and therefore not of a nature adapted to reflect improper light rays which might tend to confuse and interfere with a proper reading of the gauge; the purpose of the invention being to provide such means which will permit free access to be had to the gauge interior when occasion requires, while at the same time being of such construction that hot water when flowing or blown through the gauge will be so guided as not to be in intimate frictional contact with the inner surface of the glass.

The objects and advantages of my invention will be more fully comprehended from the detailed description of the accompanying drawing, wherein:—

Figure 1 is a longitudinal sectional view through my improved gauge.

Figure 2 is a cross sectional view taken substantially on the line 2—2 of Figure 1 looking in the direction of the arrows.

Figure 3 is a detail view in perspective of my improved partition or shutter looking at the rear side thereof.

Figure 4 is a detail view in perspective of the packing element or gasket which encircles the shutter or partition.

My invention is intended to be used with a gauge provided with a sight-glass of the Klinger type having prismatic formations or longitudinally disposed facets or surfaces on the inner side of the glass whereby a certain reflection and refraction of the light rays is produced and the water level thereby more readily discerned because of the pronounced demarcation produced by the reflected light rays.

In practice, it has been found that the inner faceted surface of the glass is subject to deterioration due to the action of the water and steam passing through the gauge, especially when they flow through the gauge with more or less velocity, which has been found to have an erosive effect on the glass. It has also been found that the distilled water or water of condensation coming from the upper end of the gauge fittings, when permitted to contact with the glass produces a disintegrating effect on the inner surface of the glass. In order to overcome the deleterious effects just referred to, I provide means as herein set forth, adapted for use in connection with a gauge consisting of a main or body portion 10 of suitable metal formed to provide a longitudinal channel or chamber throughout the casting as at 11, with the ends of the casting provided with openings or passages as at 12, 12 adapted to receive proper connections or nipples for effecting communication with the interior of the boiler or container at suitable points whereby to determine the water level in the boiler. The side walls of the body portion 10 terminate in laterally disposed portions or flanges as at 14, which are preferably kerfed or cut away adjacent the inner sides of the side walls to provide a shoulder and suitable seat for the packing element or gasket shown at 15.

The gauge is provided with a front member or cover-plate 16 formed with an elongated opening and recessed on the inner side thereof to receive the sight-glass shown at 17 and to effect comparatively snug relation with the edges of the sight-glass as shown. The front member or cover-plate 16 is preferably provided with a marginal flange along the sides thereof as shown at 18 adapted to overlap a portion of the laterally disposed sides or flanges 14 of the main body of the gauge as shown in Figure 2; and the cover-plate is secured in place by means of bolts as at 19 which extend through suitable openings in the flange portion 14 of the body and screw into tapped openings in the cover-plate as shown in Figure 2. The juncture between the cover-plate and the laterally disposed flange portions 14 of the body member is preferably provided with suitable packing as at 20, in order to effect a watertight connection between the body member and the cover-plate when the bolts 19 have been firmly screwed into place.

Before securing the cover-plate and sight-glass in place, I provide the front side of the water chamber 11 of the main casting 10 with a metallic shutter or partition 21 of length and width slightly greater than the length and width of the front side of the water chamber in order that the marginal edges of the partition or shutter 21 may be in lapping relation with the recessed portion of the side walls of the main body 10 of the gauge. The partition or shutter 21 preferably consists of a flat sheet of thin metal. In the particular exemplification of the invention as disclosed in the drawing the shutter or partition is shown slightly dished; that is to say, with the marginal edges thereof offset and disposed in a different plane from that of the main part of the shutter, as indicated at 22 in Figure 3, while the immediate edge of the shutter or partition at the same time is disposed substantially parallel with the main portion of the shutter so as to permit the flanges or immediate edge of the shutter to fit intermediate of the rear face of the sight-glass 17 and the forward face of the sides of the body 10 of the gauge or rather the packing element or gasket 15. With the construction as just described, it is apparent that a shallow water space 23 is provided as shown in Figure 1 at a point immediately adjacent the rear face of the sight-glass. Where the gauge is provided with the Klinger type of sight-glass having the longitudinal grooves on the rear face, the shutter 21 need not be dished as sufficient water-space will be provided between the glass and the shutter.

The gasket 15 is preferably made of fabric asbestos and formed into a flat continuous elongated band adapted to extend throughout the kerfed surface of the front face of body 10 of the gauge and therefore is adapted to receive the flange 22 or imperforate edge of the partition or shutter 21; which is also arranged in contact with the rear or inner face of the sight-glass 17, as shown in Figures 1 and 2.

As a result of the construction and arrangement of parts, it is apparent that when the front member or cover-plate 16 is drawn into snug relation with the front portion of the main body 10, upon tightening the fastening means or bolts 19, the thin metallic sheet or partition 21 will cause the packing element or gasket 15 to be compressed and intensified at a point where the steam and hot water come in contact with and attack the gasket; while at the same time the gasket will overlap or completely surround the entire edge of the thin metallic sheet or partition and provide a tight joint or seal which will prevent any leakage about the sight-glass and therefore prevent the hot water or steam forcing its way laterally across the inner flat marginal surface of the sight-glass. As a result of this construction, the deteriorating or disintegrating effect resulting from the hot water or steam seeping across the margin of the glass will be eliminated and the life of the gauge thereby enhanced. It has been found in practice that although the metallic portion of the gauge may be formed with a smooth, even surface, the glass is not always provided with such surface; it is therefore difficult to provide a proper juncture between the sight-glass and the metallic body of the gauge whereby the steam or hot water is prevented from seeping therebetween. The seepage of steam or hot water as just described will disintegrate the glass and cause minute grooves or channels to be worn in the flat surface of the glass, which ultimately produces a leaky gauge; as it has been my experience that if the steam or hot water is permitted to work its way laterally across the flat rear surface of the sight-glass, it will, in a comparatively brief period, escape about the edges of the sight-glass. I find that by employing a thin metal partition or shutter with a gasket as hereinbefore described, that a very intense or compact packing is provided which prevents the possibility of the water or steam acting in the manner hereinbefore stated.

As is apparent from my improved gauge, a water chamber or space is provided immediately rearward of the sight-glass, which space or chamber, however, is in free communication with the main chamber or portion of the gauge by reason of the openings formed in the partition or shutter 21. In the particular exemplification, the upper and lower ends of the shutter or partition 21 are shown provided with the comparatively large openings 24, 24, while the intermediate portion thereof is provided with openings 25 which may be slightly smaller in diameter than the openings 24. The openings are all preferably provided with the surrounding and rearwardly extending walls or thimbles 26, which may be formed integral with the main portion of the partition or shutter or otherwise secured thereto so as to be disposed rearwardly into the main water chamber of the gauge, for the purpose of preventing the water eddying into the chamber or space immediately rearward of the sight-glass. These thimbles or rearwardly extending portions 26 tend to spread the water or steam to opposite sides of the openings in the shutter during its flow through the main water chamber of the gauge; the water being deflected and prevented from passing directly into the space intermediate of the sight-glass and the forward side of the shutter or partition. I have found that the blowing-out operation in gauges where the main body of water is in direct contact with the glass, that the rapidly flowing steam and hot water has an erosive effect on the sight-glass. This serious objection and action is overcome with my improved construction because the rapidly moving steam and hot water is kept out of intimate contact with the rear face of the sight-glass; the rapid flow of the water taking place principally in the main chamber of the gauge rearward of the partition where the chamber is in direct alignment with the end openings and its connections, while the thimbles or annular portions 26 will tend to deflect the rapidly moving water and steam and retard its rapid flow forward of the shutter and therefore in immediate contact with the sight-glass. As a result, the dissipating action on the inner face of the sight-glass will be materially retarded and the life of the sight-glass therefore enhanced; at the same time the condensate will be prevented from flowing down the rear face of the glass, with the result that the disintegration of the sight-glass is also prevented. The shutter or partition 21 is preferably oxidized or provided with a dark surface to prevent the reflection of light rays, thereby giving the comparatively thin film of water forward of the shutter or partition the appearance of depth, with the result that the light reflection and refraction, produced by the Klinger glass, will not be destroyed or affected.

It is also apparent that my improved shutter or partition, which is composed of thin sheet metal, may be readily applied to water gauges of the general type mentioned and at present in use, without necessitating any change in the gauge construction, thereby eliminating the difficulties encountered and greatly enhancing the life of the gauge.

The construction disclosed in the drawing I believe to be the simplest and best embodiment of my invention which has been described in terms employed merely as terms of description and not as terms of limitation, as structural modifications are possible and may be made without departing from the spirit of my invention.

What I claim is:—

1. In a water gauge, a main body portion formed to provide a water chamber and having openings at opposite ends thereof, a cover member provided with a sight opening and adapted to be secured to the front side of the main body portion, a sight-glass disposed across said sight-opening in said cover member and held against the forward side of the body portion by said cover member, and a partition or shutter disposed adjacent to the rear face of the sight-glass with the marginal edges thereof clamped intermediate of the sight-glass and forward side of the main body portion, said partition or shutter being provided with openings to permit the water to enter intermediate of the rear face of the sight-glass and said partition or shutter.

2. A water gauge, comprising an open-sided body portion having connection-receiving openings in the ends thereof, a cover member for said open side, adapted to be removably secured to the body portion and provided with an elongated sight-opening, a sight-glass adapted to be held intermediate of the body portion and the cover member, and a thin metallic shutter adapted to be clamped between the sight-glass and the body portion, the perimeter of the shutter being off-set to provide a chamber intermediate of the shutter and the sight-glass, the shutter being provided with openings in predetermined spaced relation, with the metal about the openings being flanged rearwardly into the main body portion.

3. In a water gauge, a body member formed to provide an open-sided water chamber having inlet and outlet openings at opposite ends, a cover-member for said open side provided with an elongated sight-opening and adapted to be removably secured to the body member by bolts at the sides of the body member, a sight-glass disposed transversely of the sight-opening between the body member and the cover member, a partition or shutter, the edges whereof are removably clamped between the edges of the sight-glass and the forward face of the body member, said partition being provided with openings to permit the water to enter between the partition and the sight-glass, and a continuous gasket of greater width than the clamped marginal edges of the partition disposed intermediate of the edges of the partition and the body member and intermediate of the sight-glass and the body member so as to lap and surround the edges of the partition.

4. In a water gauge, a main member apertured at both ends to receive fluid-conveying connections and formed to provide a water chamber in alignment with said apertures, a cover member having a sight-opening adapted to be secured to the main member, the opposing faces of the main member and the cover member being recessed, a sight-glass disposed in the recesses of the main member and the cover member and adapted to be thereby removably clamped in place, and a thin metallic partition or shutter having off-set edges adapted to be clamped between the sight-glass and the main member and be disposed in a plane forward of the apertures in the ends of the main member, said partition being provided with openings at predetermined points, with the metal about said openings being disposed rearwardly.

5. A water gauge comprising a main member apertured at both ends to receive fluid-conveying connections and formed to provide a water chamber in alignment with said apertures, a cover member having a sight-opening and adapted to be removably secured to the main member, a sight-glass removably held intermediate of the main member and said cover member, a partition or shutter disposed rearward of the sight-glass with the edges thereof arranged between the sight-glass and the forward wall of the main member and thereby removably held in place, said partition being formed to provide a water-space between the partition and the sight-glass and having openings at predetermined points to effect communication between said water-space and the water chamber in the main member, and means disposed on the rear face of said partition whereby direct flow from the main chamber into said water-space will be prevented.

6. In a water gauge of the character described, a body member formed to provide an open-sided water chamber having inlet and outlet openings at opposite ends, a cover member for said open side, provided with an elongated sight-opening and adapted to be removably secured to the body member, a sight-glass disposed transversely of the sight-opening, a partition or shutter the edges whereof are adapted to be clamped between the sight-glass and the body member, said partition being provided with openings to admit the water between the partition and rear side of the sight-glass, baffles disposed about said openings on the rear side of the partition whereby direct flow into the space forward of the partition during rapid flow through the gauge is prevented, and a continuous gasket adapted to be compressed intermediate of said partition and the body member and be in abutting relation with the perimeter of said partition intermediate of the body member and said sight-glass.

7. In a water gauge of the characer described, a body member formed to provide an open sided water chamber having inlet and outlet openings at opposite ends, a cover member for said open side adapted to be removably secured to the body member, a sight-glass for said opening disposed between the body member and the cover member, and a partition or shutter marginally clamped between the sight-glass and the body member and provided with relatively large openings at predetermined points to permit the water to enter between the partition and the sight-glass, the portion of the partition about said openings being extended or flared rearwardly so as to prevent direct flow into the water space forward of the partition during the rapid flow of the water through the gauge in "blow-off" operations.

8. In a water gauge of the character described, a body member formed to provide an open sided water chamber having inlet and outlet openings at opposite ends, a cover member for said open side adapted to be removably secured in place, a sight-glass disposed intermediate of the cover-member and body member, a thin metallic shutter or partition marginally clamped between the sight-glass and the body member and provided with spaced openings to permit the water to flow into the space intermediate of the partition and the sight-glass, means disposed about the openings on the rear side of the partition or shutter whereby direct flow of the water forward of the partition or shutter is prevented, and a continuous gasket disposed intermediate of the partition and the body member and in lapping relation with the perimeter of the partition, intermediate of the body member and the sight-glass.

GEORGE H. SARGENT.

Witnesses:
G. HEIDMAN,
F. A. FLORELL.